(12) United States Patent
Eickhoff et al.

(10) Patent No.: US 8,557,479 B2
(45) Date of Patent: Oct. 15, 2013

(54) SLIDEABLE CYLINDRICAL VALVE FOR FUEL CELL

(75) Inventors: Steven J. Eickhoff, Brooklyn Park, MN (US); Bob Ellman, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 389 days.

(21) Appl. No.: 12/829,082

(22) Filed: Jul. 1, 2010

(65) Prior Publication Data

US 2011/0003237 A1 Jan. 6, 2011

Related U.S. Application Data

(60) Provisional application No. 61/223,324, filed on Jul. 6, 2009.

(51) Int. Cl.
*H01M 8/04* (2006.01)
(52) U.S. Cl.
USPC .......................................................... 429/513
(58) Field of Classification Search
USPC .......................................................... 429/513
See application file for complete search history.

(56) References Cited

U.S. PATENT DOCUMENTS

| | | | |
|---|---|---|---|
| 2,935,382 A | 5/1960 | Osborn et al. | |
| 3,133,837 A | 5/1964 | Eidensohn | |
| 3,765,946 A | 10/1973 | Werner et al. | |
| 3,931,395 A | 1/1976 | Beckert et al. | |
| 3,994,697 A | 11/1976 | Burke | |
| 4,048,385 A | 9/1977 | Regnaut | |
| 4,138,089 A | 2/1979 | McCarthy | |
| 4,155,712 A | 5/1979 | Taschek | |
| 4,261,955 A | 4/1981 | Bailey, Jr. et al. | |
| 4,476,196 A | 10/1984 | Poeppel et al. | |
| 4,476,197 A | 10/1984 | Herceg | |
| 4,596,748 A | 6/1986 | Katz et al. | |
| 4,629,664 A | 12/1986 | Tsukui et al. | |
| 4,659,559 A | 4/1987 | Struthers | |
| 4,826,741 A | 5/1989 | Aldhart et al. | |
| 4,857,420 A | 8/1989 | Maricle et al. | |
| 4,872,472 A | 10/1989 | Lefevre et al. | |

(Continued)

FOREIGN PATENT DOCUMENTS

| | | |
|---|---|---|
| DE | 19734259 A1 | 2/1999 |
| EP | 1351329 A1 | 10/2003 |

(Continued)

OTHER PUBLICATIONS

"U.S. Appl. No. 11/606,758, Response filed Aug. 17, 2011 to Final Office Action mailed Jun. 24, 2011", 14 pgs.

(Continued)

*Primary Examiner* — Patrick Ryan
*Assistant Examiner* — Muhammad Siddiquee
(74) *Attorney, Agent, or Firm* — Schwegman, Lundberg & Woessner, P.A.

(57) ABSTRACT

A power generator including one or more fuel cells, a fuel chamber enclosing a hydrogen generating fuel, and one or more slideable cylindrical valves in contact with the fuel chamber. The one or more valves include an inner cylindrical component with first perforations, and a slideable cylindrical component with second perforations and having a plurality of separated flexible sections. The valves are useful in controlling the flow of hydrogen into the anode portion of the fuel cell.

20 Claims, 5 Drawing Sheets

(56) References Cited

U.S. PATENT DOCUMENTS

| | | |
|---|---|---|
| 4,876,163 A | 10/1989 | Reichner |
| 4,906,536 A | 3/1990 | Simonton |
| 4,910,100 A | 3/1990 | Nakanishi et al. |
| 5,248,125 A | 9/1993 | Fritch et al. |
| 5,298,341 A | 3/1994 | Khandkar et al. |
| 5,372,617 A | 12/1994 | Kerrebrock et al. |
| 5,443,616 A | 8/1995 | Congdon |
| 5,449,697 A | 9/1995 | Noaki et al. |
| 5,534,363 A | 7/1996 | Sprouse et al. |
| 5,789,100 A | 8/1998 | Burroughs et al. |
| 5,804,329 A | 9/1998 | Amendola |
| 5,836,750 A | 11/1998 | Cabuz et al. |
| 5,849,046 A | 12/1998 | Bailey |
| 5,851,689 A | 12/1998 | Chen |
| 5,861,221 A | 1/1999 | Ledjeff et al. |
| 5,948,558 A | 9/1999 | Amendola |
| 5,974,235 A | 10/1999 | Nunally et al. |
| 5,992,857 A * | 11/1999 | Ueda et al. ................. 277/592 |
| 6,052,124 A | 4/2000 | Stein et al. |
| 6,054,234 A | 4/2000 | Weiss et al. |
| 6,093,501 A | 7/2000 | Werth |
| 6,127,058 A | 10/2000 | Pratt et al. |
| 6,179,986 B1 | 1/2001 | Swette et al. |
| 6,250,078 B1 | 6/2001 | Amendola et al. |
| 6,265,093 B1 | 7/2001 | Surampudi et al. |
| 6,268,076 B1 | 7/2001 | Dickmann et al. |
| 6,280,869 B1 | 8/2001 | Chen |
| 6,303,244 B1 | 10/2001 | Surampudi et al. |
| 6,307,605 B1 | 10/2001 | Bailey |
| 6,326,097 B1 | 12/2001 | Hockaday |
| 6,406,808 B1 | 6/2002 | Pratt et al. |
| 6,413,665 B1 | 7/2002 | Blanchet et al. |
| 6,428,680 B1 | 8/2002 | Kreichauf |
| 6,432,566 B1 | 8/2002 | Condit et al. |
| 6,433,129 B1 | 8/2002 | Amendola et al. |
| 6,434,278 B1 | 8/2002 | Hashimoto |
| 6,468,694 B1 | 10/2002 | Amendola |
| 6,471,850 B2 | 10/2002 | Shiepe et al. |
| 6,483,275 B1 | 11/2002 | Nebrigic et al. |
| 6,497,973 B1 | 12/2002 | Amendola |
| 6,506,510 B1 | 1/2003 | Sioui et al. |
| 6,506,511 B1 | 1/2003 | Lakeman et al. |
| 6,508,195 B1 * | 1/2003 | Tipaldo ................. 116/63 P |
| 6,524,450 B1 | 2/2003 | Hara |
| 6,524,542 B2 | 2/2003 | Amendola et al. |
| 6,534,033 B1 | 3/2003 | Amendola et al. |
| 6,535,658 B1 | 3/2003 | Mendoza et al. |
| 6,541,149 B1 | 4/2003 | Maynard et al. |
| 6,544,679 B1 | 4/2003 | Petillo et al. |
| 6,586,563 B1 | 7/2003 | Ortega et al. |
| 6,596,236 B2 | 7/2003 | DiMeo, Jr. et al. |
| 6,610,193 B2 | 8/2003 | Schmitman |
| 6,620,542 B2 | 9/2003 | Pan |
| 6,632,554 B2 | 10/2003 | Doshi et al. |
| 6,638,654 B2 | 10/2003 | Jankowksi et al. |
| 6,645,651 B2 | 11/2003 | Hockaday et al. |
| 6,670,444 B2 | 12/2003 | Amendola et al. |
| 6,672,078 B2 | 1/2004 | Ovshinsky et al. |
| 6,683,025 B2 | 1/2004 | Amendola et al. |
| 6,706,909 B1 | 3/2004 | Snover et al. |
| 6,727,012 B2 | 4/2004 | Chen et al. |
| 6,728,422 B1 | 4/2004 | Weiss |
| 6,760,488 B1 | 7/2004 | Moura et al. |
| 6,801,136 B1 | 10/2004 | Goodman et al. |
| 6,804,949 B2 | 10/2004 | Andrews et al. |
| 6,833,207 B2 | 12/2004 | Joos et al. |
| 6,852,436 B2 | 2/2005 | Badding et al. |
| 6,866,806 B2 | 3/2005 | Andrews et al. |
| 6,932,847 B2 | 8/2005 | Amendola et al. |
| 6,939,529 B2 | 9/2005 | Strizki et al. |
| 6,942,941 B2 | 9/2005 | Blunk et al. |
| 6,950,030 B2 | 9/2005 | Kovarik et al. |
| 6,953,009 B2 | 10/2005 | Reinke et al. |
| 6,977,123 B1 | 12/2005 | Burroughs et al. |
| 7,001,681 B2 | 2/2006 | Wood |
| 7,019,105 B2 | 3/2006 | Amendola et al. |
| 7,049,024 B2 | 5/2006 | Leban |
| 7,073,368 B2 | 7/2006 | Wood et al. |
| 7,083,657 B2 | 8/2006 | Mohring et al. |
| 7,105,033 B2 | 9/2006 | Strizki et al. |
| 7,108,777 B2 | 9/2006 | Xu et al. |
| 7,128,997 B2 | 10/2006 | Harding et al. |
| 7,322,205 B2 | 1/2008 | Bourne et al. |
| 7,367,334 B2 | 5/2008 | Faison, Jr. et al. |
| 7,524,342 B2 | 4/2009 | Brinkley, III |
| 7,527,885 B2 | 5/2009 | Toukura |
| 7,691,527 B2 | 4/2010 | Petillo et al. |
| 7,807,131 B2 | 10/2010 | Eickhoff |
| 2001/0028973 A1 | 10/2001 | Ong et al. |
| 2002/0068213 A1 | 6/2002 | Kaiser et al. |
| 2002/0114983 A1 | 8/2002 | Frank et al. |
| 2002/0154310 A1 | 10/2002 | DiMeo, Jr. et al. |
| 2002/0177031 A1 | 11/2002 | Doshi et al. |
| 2003/0009942 A1 | 1/2003 | Amendola et al. |
| 2003/0044656 A1 | 3/2003 | Wood |
| 2003/0054215 A1 | 3/2003 | Doshi et al. |
| 2003/0157018 A1 | 8/2003 | Zaluski et al. |
| 2003/0235728 A1 | 12/2003 | Van Zee et al. |
| 2004/0009379 A1 | 1/2004 | Amendola et al. |
| 2004/0011662 A1 | 1/2004 | Xu et al. |
| 2004/0033194 A1 | 2/2004 | Amendola et al. |
| 2004/0035054 A1 | 2/2004 | Mohring et al. |
| 2004/0047801 A1 | 3/2004 | Petillo et al. |
| 2004/0053100 A1 | 3/2004 | Stanley et al. |
| 2004/0101740 A1 | 5/2004 | Sanders |
| 2004/0120889 A1 | 6/2004 | Shah et al. |
| 2004/0148857 A1 | 8/2004 | Strizki et al. |
| 2004/0161646 A1 | 8/2004 | Rezachek et al. |
| 2004/0191152 A1 | 9/2004 | Amendola et al. |
| 2004/0209133 A1 | 10/2004 | Hirsch et al. |
| 2004/0215407 A1 | 10/2004 | Thielman et al. |
| 2005/0022883 A1 | 2/2005 | Adams et al. |
| 2005/0079128 A1 | 4/2005 | DeVos et al. |
| 2005/0118469 A1 | 6/2005 | Leach et al. |
| 2005/0132640 A1 | 6/2005 | Kelly et al. |
| 2005/0135996 A1 | 6/2005 | Ortega et al. |
| 2005/0136300 A1 | 6/2005 | Dyer |
| 2005/0142410 A1 | 6/2005 | Higashi et al. |
| 2005/0158595 A1 | 7/2005 | Marsh et al. |
| 2005/0166812 A1 | 8/2005 | Noll et al. |
| 2005/0181245 A1 | 8/2005 | Bonne et al. |
| 2005/0199546 A1 | 9/2005 | Rusta-Sallehy et al. |
| 2005/0238573 A1 | 10/2005 | Zhang et al. |
| 2005/0249993 A1 | 11/2005 | Horiuchi et al. |
| 2005/0260461 A1 | 11/2005 | Wood et al. |
| 2005/0262924 A1 | 12/2005 | Wood et al. |
| 2005/0268555 A1 | 12/2005 | Amendola |
| 2005/0276746 A1 | 12/2005 | Zhang et al. |
| 2006/0014059 A1 | 1/2006 | Wood |
| 2006/0021279 A1 | 2/2006 | Mohring et al. |
| 2006/0040152 A1 | 2/2006 | Wood |
| 2006/0045228 A1 | 3/2006 | Shiao et al. |
| 2006/0102489 A1 | 5/2006 | Kelly |
| 2006/0102491 A1 | 5/2006 | Kelly et al. |
| 2006/0127722 A1 | 6/2006 | Nakajima et al. |
| 2006/0144701 A1 | 7/2006 | Kelly |
| 2006/0174952 A1 | 8/2006 | Curello et al. |
| 2006/0210850 A1 | 9/2006 | Abouatallah et al. |
| 2006/0261349 A1 | 11/2006 | Doering et al. |
| 2007/0026282 A1 | 2/2007 | Kumagai et al. |
| 2007/0104996 A1 | 5/2007 | Eickhoff et al. |
| 2007/0105008 A1 | 5/2007 | Gu et al. |
| 2007/0141440 A1 | 6/2007 | Yang et al. |
| 2007/0190400 A1 | 8/2007 | Buche et al. |
| 2007/0217994 A1 | 9/2007 | Amendola et al. |
| 2007/0237995 A1 | 10/2007 | Eickhoff et al. |
| 2007/0259227 A1 | 11/2007 | Oishi et al. |
| 2007/0269698 A1 | 11/2007 | Gu |
| 2007/0271844 A1 * | 11/2007 | Mohring et al. ................. 48/61 |
| 2007/0275291 A1 | 11/2007 | Gu et al. |
| 2007/0277870 A1 | 12/2007 | Wechsler |
| 2007/0287059 A1 | 12/2007 | Eickhoff et al. |
| 2008/0003484 A1 | 1/2008 | Chen et al. |
| 2008/0057378 A1 | 3/2008 | Kang et al. |

(56) References Cited

U.S. PATENT DOCUMENTS

| | | | |
|---|---|---|---|
| 2008/0090129 | A1 | 4/2008 | Kunz et al. |
| 2008/0107930 | A1* | 5/2008 | Eickhoff et al. ............... 429/13 |
| 2008/0124609 | A1 | 5/2008 | Sasahara et al. |
| 2008/0160383 | A1 | 7/2008 | Shen et al. |
| 2008/0199740 | A1 | 8/2008 | Giddey et al. |
| 2008/0220300 | A1 | 9/2008 | Jones et al. |
| 2008/0241635 | A1 | 10/2008 | Sato et al. |
| 2008/0268299 | A1* | 10/2008 | Eickhoff et al. ............... 429/17 |
| 2008/0274393 | A1 | 11/2008 | Markoski et al. |
| 2008/0280169 | A1 | 11/2008 | Niu et al. |
| 2008/0280183 | A1 | 11/2008 | Eun et al. |
| 2009/0113795 | A1 | 5/2009 | Eickhoff |
| 2010/0151283 | A1 | 6/2010 | Eickhoff |
| 2010/0151346 | A1 | 6/2010 | Eickhoff |

FOREIGN PATENT DOCUMENTS

| | | | |
|---|---|---|---|
| EP | 1372205 | A2 | 12/2003 |
| EP | 1496561 | A2 | 1/2005 |
| EP | 1372205 | A3 | 7/2005 |
| EP | 1845572 | A1 | 10/2007 |
| EP | 1372205 | B1 | 10/2008 |
| EP | 2055669 | A2 | 5/2009 |
| EP | 2056382 | A2 | 5/2009 |
| EP | 2055669 | A3 | 1/2010 |
| GB | 723180 | A | 2/1955 |
| GB | 2164446 | A | 3/1986 |
| JP | 57-138782 | A | 8/1982 |
| JP | 60-000066 | A | 1/1985 |
| JP | 4-342439 | A | 11/1992 |
| JP | 666787 | A | 3/1994 |
| JP | 9-326259 | A | 12/1997 |
| WO | WO-00/35032 | A1 | 6/2000 |
| WO | WO-00/45457 | A2 | 8/2000 |
| WO | WO-01/85606 | A1 | 11/2001 |
| WO | WO-03/084866 | A2 | 10/2003 |
| WO | WO-2004/025750 | A2 | 3/2004 |
| WO | WO-2004/035464 | A2 | 4/2004 |
| WO | WO-2004/075375 | A2 | 9/2004 |
| WO | WO-2005/004273 | A2 | 1/2005 |
| WO | WO-2005/013403 | A2 | 2/2005 |
| WO | WO-2006/113469 | A1 | 10/2006 |
| WO | WO-2007/134095 | A2 | 11/2007 |

OTHER PUBLICATIONS

"U.S. Appl. No. 11/606,758, Final Office Action mailed Jun. 24, 2011", 10 pgs.

"U.S. Appl. No. 12/335,352 Response filed Nov. 8, 2011 to Restriction Requirement mailed Oct. 12, 2011", 6 pgs.

"U.S. Appl. No. 12/335,352, Restriction Requirement mailed Oct. 12, 2011", 5 pgs.

"European Application Serial No. 07854813.8, Response filed Jun. 9, 2011 to Office Action mailed Feb. 9, 2011", 7 pgs.

"U.S. Appl. No. 12/335,352, Advisory Action mailed Jun. 6, 2012", 3 pgs.

"U.S. Appl. No. 12/335,352, Final Office Action mailed Apr. 27, 2012", 13 pgs.

"U.S. Appl. No. 12/335,352, Non Final Office Action mailed Dec. 23, 2011", 10 pgs.

"U.S. Appl. No. 12/335,352, Preliminary Amendment filed Dec. 15, 2008", 3 pgs.

"U.S. Appl. No. 12/335,352, Response filed Jan. 27, 2012 to Non Final Office Action mailed Dec. 23, 2011", 12 pgs.

"U.S. Appl. No. 12/335,352, Response filed May 16, 2012 to Final Office Action mailed Apr. 27, 2012", 14 pgs.

"U.S. Appl. No. 12/705,423, Preliminary Amendment filed Feb. 10, 2011", 6 pgs.

"European Application Serial No. 07854813.8, Office Action mailed Dec. 21, 2011", 4 pgs.

"European Application Serial No. 07854813.8, Response filed Apr. 13, 2012 to Office Action mailed Dec. 21, 2012", 6 pgs.

"International Application Serial No. PCT/US2007/085766, International Preliminary Report on Patentability dated Jun. 3, 2009", 6 pgs.

Aiello, R, et al., "Production of Hydrogen from Chemical hydrides via hydrolysis with steam", *International Journal of Hydrogen Energy*, 24, (1999), 1123-1130.

Amendola, S. C., et al., "A Safe, Portable, Hydrogen Gas Generator Using Aqueous Borohydride Solution and Ru Catalyst", *International Journal of Hydrogen Energy*, 25(10), (2000), 969-975.

Amendola, S. C., et al., "A Novel High Power Density Borohydride-Air Cell", (Abstract), *Electrochemical Society Proceedings*; vol. 98-15, (1998), 10 pgs.

Amendola, S. C., et al., "An Ultrasafe Hydrogen Generator: Aqueous, Alkaline Borohydride Solutins and Ru Catalyst", (Abstract); *Journal of Power Sources*, 85(2), (2000), 4 pgs.

"U.S. Appl. No. 11/592,692, Non-Final Office Action mailed Jul. 23, 2010", 9 pgs.

"U.S. Appl. No. 11/592,692, Preliminary Amendment filed Nov. 3, 2006", 3 pgs.

"U.S. Appl. No. 11/592,692, Response filed Apr. 28, 2010 to Restriction Requirement mailed Mar. 31, 2010", 7 pgs.

"U.S. Appl. No. 11/592,692, Restriction Requirement mailed Mar. 31, 2010", 6 pgs.

"U.S. Appl. No. 11/606,758 Final Office Action mailed Sep. 15, 2010", 9 pgs.

"U.S. Appl. No. 11/606,758, Examiner Interview Summary Request mailed Mar. 25, 2010", 1 pg.

"U.S. Appl. No. 11/606,758, Final Office Action mailed Jun. 10, 2009", 10 pgs.

"U.S. Appl. No. 11/606,758, Non-Final Office Action mailed Mar. 25, 2010", 11 pgs.

"U.S. Appl. No. 11/606,758, Non-Final Office Action mailed May 12, 2008", 13 pgs.

"U.S. Appl. No. 11/606,758, Non-Final Office Action mailed Nov. 13, 2009", 11 pgs.

"U.S. Appl. No. 11/606,758, Non-Final Office Action mailed Nov. 24, 2008", 10 pgs.

"U.S. Appl. No. 11/606,758, Response filed Feb. 7, 2008 to Restriction Requirement mailed Jan. 7, 2008", 6 pgs.

"U.S. Appl. No. 11/606,758, Response filed Feb. 24, 2009 to Non Final Office Action mailed Nov. 24, 2008", 9 pgs.

"U.S. Appl. No. 11/606,758, Response filed Jun. 21, 2010 to Non Final Office Action mailed Mar. 25, 2010", 12 pgs.

"U.S. Appl. No. 11/606,758, Response filed Jan. 4, 2010 to Non Final Office Action mailed Nov. 13, 2009", 12 pgs.

"U.S. Appl. No. 11/606,758, Response filed Nov. 10, 2010 to Final Office Action mailed Sep. 15, 2010", 13 pgs.

"U.S. Appl. No. 11/606,758, Response filed Sep. 10, 2009 to Final Office Action mailed Jun. 10, 2009", 12 pgs.

"U.S. Appl. No. 11/606,758,, Response filed Aug. 12, 2008 to Non-Final Office Action mailed May 12, 2008", 11 pgs.

"U.S. Appl. No. 11/606,759, Restriction Requirement mailed Jan. 7, 2008", 6 pgs.

"European Application Serial No. 07854813.8, Office Action mailed Feb. 9, 2011", 5 pgs.

"Hobby RC Industry Leaps into the Future with Hydrogen Power", [online]. http://www.horizonfuelcell.com/files/HorizonpressreleasehcellFeb2010.pdf, Horizon Fuel Cell Technologies, (Feb. 3, 2010), 2 pgs.

"International Application Serial No. PCT/US2007/085766, International Search Report mailed Apr. 2, 2008", 4 pgs.

"International Application Serial No. PCT/US2007/085766, Written Opinion mailed Apr. 2, 2008", 6 pgs.

Diaz, H., et al., "Thermodynamic and Structural properties of $LaNi_{5-y}Ai_y$ compounds and their related hydrides", *International Journal of Hydrogen Energy*, 4, (1979), 445-454.

Melanson, D., "Horizon debuts H-Cell 2,0 hydrogen fuel cell system for R/C cars", [online]. [retrieved Feb. 18, 2010]. Retrieved from the Internet: <URL: http://www.engadget.com/2010/02/03/horizon-debuts-h-cell-2-0-hydrogen-fuel-cell-system-for-r-c-cars/>, *From Engadget Blog*, (2010), 3 pgs.

Mendelsohn, M. H., et al., "The Effect of Aluminum Additions on the Structural and Hydrogen Absorption properties of $AB_5$ Alloys with (56) References Cited

OTHER PUBLICATIONS

Particular reference to the $LaNi_{5-x}Al_x$ Ternary Alloy System", *Journal of the Less-Common Metals*, 63, (1979), 193-207.

Pasaogullari, U., "Liquid Water Transport in Polymer Electrolyte Fuel Cells with Multi-Layer Diffusion Media", *Proceedings of IMECE04, 2004 ASME International Mechanical Engineering Congress and Exposition*, Anaheim, California, (Nov. 13-20, 2004), 1-9.

"U.S. Appl. No. 12/705,423, Amendment and Response filed Aug. 1, 2012 to Restriction Requirement mailed Jul. 16, 2012", 5 pgs.

"U.S. Appl. No. 12/705,383, Non Final Office Action mailed Oct. 3, 2012", 10 pgs.

"U.S. Appl. No. 12/705,423, Non Final Office Action mailed Sep. 6, 2012", 7 pgs.

"U.S. Appl. No. 12/705,423, Response filed Oct. 16, 2012 to Non Final Office Action mailed Sep. 6, 2012", 8 pgs.

"U.S. Appl. No. 12/705,423, Restriction Requirement mailed Jul. 16, 2012", 5 pgs.

"U.S. Appl. No. 12/705,383, Response filed Aug. 30, 2012 to Restriction Requirement mailed Aug. 23, 2012", 7 pgs.

"U.S. Appl. No. 12/705,383, Restriction Requirement mailed Aug. 23, 2012", 5 pgs.

"European Application Serial No. 11153723.9, European Search Report mailed Mar. 22, 2011", 2 pgs.

"European Application Serial No. 11153723.9, Office Action mailed May 20, 2011", 5 pgs.

"European Application Serial No. 11153723.9, Response filed Sep. 21, 2011 to Office Action mailed May 20, 2011", 2 pgs.

"European Application Serial No. 11154088.6, European Search Report mailed May 23, 2011", 3 pgs.

"European Application Serial No. 11154088.6, Office Action mailed May 30, 2011", 5 pgs.

"European Application Serial No. 11154088.6, Office Action mailed Aug. 22, 2011", 2 pgs.

"European Application Serial No. 11154088.6, Response filed Sep. 12, 2011 to Office Action mailed May 30, 2010", 12 pgs.

"U.S. Appl. No. 11/606,758, Non Final Office Action mailed May 14, 2013", 13 pgs.

"U.S. Appl. No. 12/705,423, Advisory Action mailed May 10, 2013", 3 pgs.

\* cited by examiner

SLIDEABLE CYLINDRICAL VALVE FOR FUEL CELL

RELATED APPLICATIONS

This application claims the benefit of U.S. Provisional Patent Application 61/223,324 filed Jul. 6, 2009, entitled "FUEL CELL VALVE CONFIGURATION" the contents of which application is incorporated herein by reference in its entirety.

BACKGROUND

1. Field of Invention

This invention relates to a slideable cylindrical valve for controlling the hydrogen flow in fuel cell.

2. Background

Fuel cells, such as PEM fuel cells, use a simple chemical reaction to combine hydrogen and oxygen into water, producing electric current in the process. Hydrogen may be produced by a chemical reaction between a fuel, such as lithium aluminum hydride, and water vapor or by absorption/desorption-adsorption/desorption of hydrogen from a metal hydride. At an anode, hydrogen molecules are ionized by a platinum catalyst, and give up electrons. The proton exchange membrane (PEM) allows protons but not electrons to flow through the membrane. As a result, hydrogen ions flow through the PEM to a cathode, while electrons flow through an external circuit. As the electrons travel through the external circuit, they can perform useful work by powering an electrical device such as an electric motor, light bulb or electronic circuitry. At the cathode, the electrons and hydrogen ions combine with oxygen to form water. The byproducts of the reaction are water and heat.

Valves currently suitable for controlling hydrogen flow in passively regulated micro fuel cells require high tolerances to provide adequate sealing, yet need to be capable of allowing transport of sufficient hydrogen to respond to the demand of the electrical load. High tolerance valves meeting these requirements are difficult to manufacture, expensive, and often require high actuation force.

SUMMARY

An electrical power generator includes one or more fuel cells, a fuel chamber enclosing a hydrogen generating fuel, and one or more valves in contact with the fuel chamber. The one or more valves at least partially surrounds the fuel chamber and includes concentric inner and outer components; a fixed component with first perforations, and a slideable component with second perforations and having a plurality of separated flexible sections. In one embodiment, the concentric components are cylindrical and the inner cylindrical component is fixed and the outer cylindrical component is slideable.

A fuel cell system valve includes concentric inner and outer components; a fixed component with first perforations, and a slideable component with second perforations and having a plurality of flexible sections positioned on the slideable cylindrical component. In one embodiment, the concentric components are cylindrical and the inner cylindrical component is fixed and the outer cylindrical component is slideable. The valve at least partially surrounds a hydrogen generating fuel.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The electrical power generator described herein generates hydrogen gas internally either through the reaction of water vapor with a chemical hydride fuel or by release of hydrogen from a metal hydride. The hydrogen gas is reacted with atmospheric oxygen from the air at a fuel cell to generate electrical energy. The reaction of hydrogen and oxygen also produces water molecules as a byproduct at the fuel cell. This generated water may be passively diffused from the fuel cell as water vapor to a fuel chamber or cavity that contains the chemical hydride fuel substance, where it reacts with the fuel substance to generate hydrogen gas. The electrical energy generated may be used to power large or small devices that are connected to the power generator, depending on the size of the power generator. The power generator of the embodiments of the invention is particularly useful for powering miniature devices such as wireless sensors, cellular phones or other hand held electronic devices that are electrically connected to the anode and cathode of the one or more fuel cells of the power generator.

Figure 1:
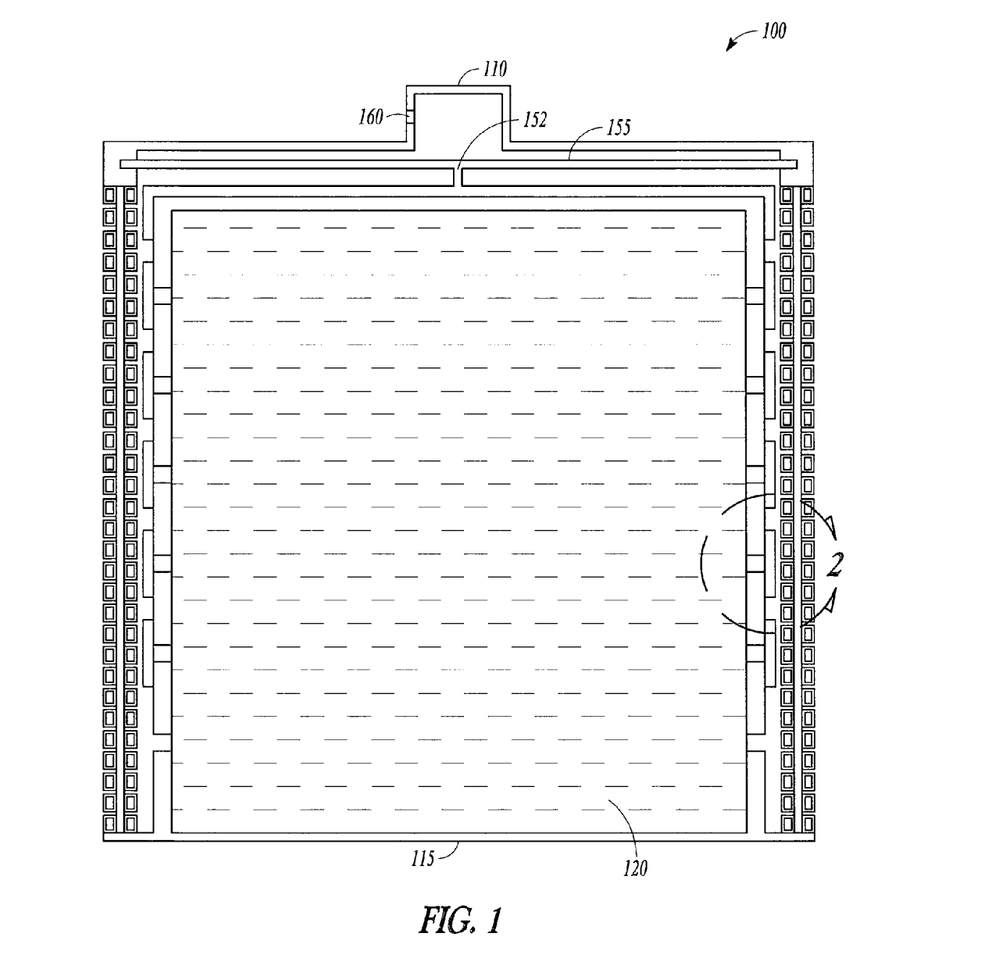
FIG. 1 is a cross section representation 100 of a fuel cell based power generator having a slide valve according to an exemplary embodiment.

FIG. 1 is a cross section representation of a fuel cell based power generator 100 according to an example embodiment. Generator 100 includes a cathode output electrode 110 and an anode output electrode 115. In one embodiment, the generator may be shaped similar to a commercially available "dry cell" battery such as an "AA", "AAA", "C", or "D" cell, such that it can be substituted for such a battery. A fuel chamber 120 may contain a hydrogen containing fuel that provides hydrogen to a fuel cell stack 125, which is shown in expanded form in FIG. 2, wherein the numbering is consistent with FIG. 1.

Figure 2:
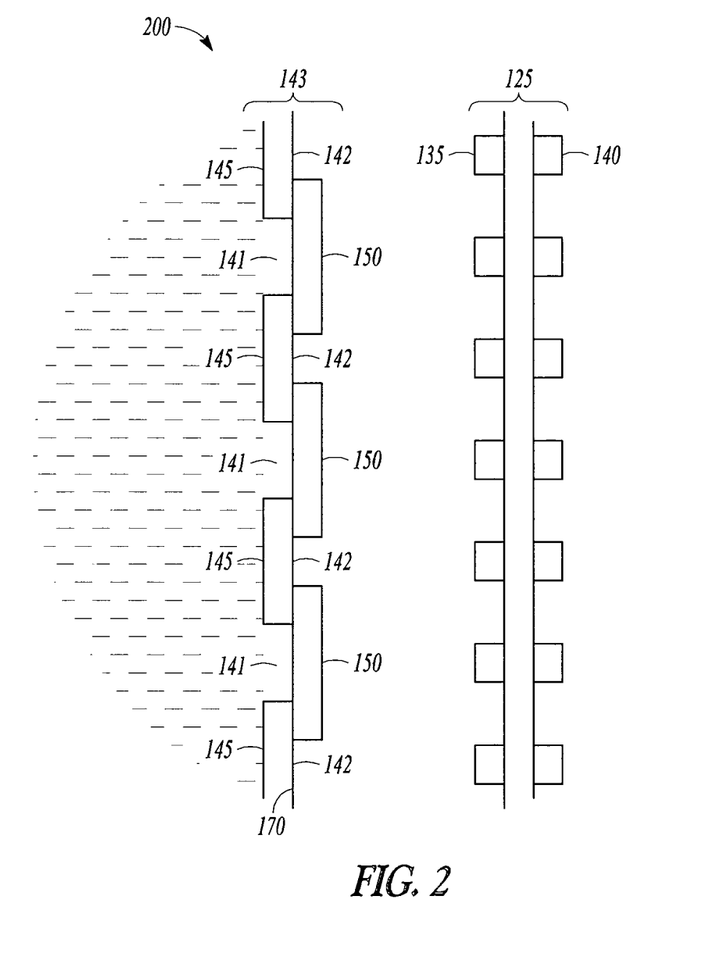
FIG. 2 is an expanded view 200 of valve plates forming a low friction contact to enable relative movement or sliding, according to some embodiments.

Fuel cell stack 125 may include a proton exchange membrane (PEM), catalyst layer, gas diffusion layer, and a micro porous layer. An anode electrode 135 is coupled to the fuel cell stack 125 between the fuel cell stack 125 and the fuel chamber 120. It is also coupled to the anode output electrode 115. A cathode electrode 140 is coupled to the other side of the fuel cell stack, and is coupled to the cathode output electrode 110. It may also be exposed to ambient conditions.

In the embodiments exemplified herein, the electrical power generator and fuel cell system valve are shown having concentric inner and outer cylindrical components; an inner fixed cylindrical component and an outer slideable cylindrical component. It is to be understood that in alternative embodiments, the inner cylindrical component may be slideable and the outer cylindrical component may be fixed.

Between the fuel cell 125 and the hydrogen chamber 120 is a slide valve 143. Slide valve 143 is made up of two cylindrical sleeves that are concentric and adjacent to each other. Slide valve 143 includes a fixed plate 145 and a slideable plate 150 that are coupled in a sliding relationship in one embodiment. A hydrogen and water vapor permeable particulate filter (not shown) may also be used between the fuel cell and the fuel or fuel chamber 120. In one embodiment, the fixed plate 145 is supported in fixed position proximate or adjacent to the fuel chamber 120, and the slideable plate 150 is coupled to a flexible diaphragm 155, that flexes in response to changes in pressure between the hydrogen pressure in the fuel chamber and ambient pressure. A hole 160 provides the diaphragm access to atmospheric pressure. The diaphragm 155 acts as a pressure responsive actuator that controls the slide valve. Each of the fixed plate 145 and slideable plate 150 has openings (such as perforations) that prevent flow when in a closed position and allow flow when the openings (such as perforations) at least partially line up.

The slide valve 143 responds to a pressure differential between ambient and the inside of the power generator. In one embodiment the power generator is cylindrical in shape and the valve plates 145 and 150 are concentric cylinders having mating perforations. Fixed plate 145 and movable plate 150 correspond to an inner cylinder and an outer cylinder respectively. When a pressure differential exists across the membrane 155 such as when hydrogen pressure is greater than ambient pressure, the membrane 155 deflects and moves the outer cylinder 150 axially relative to the inner cylinder. The movement of the outer cylinder relative to the inner cylinder causes the perforations to become misaligned, which closes the valve.

The plates in one embodiment are as thin as possible to maintain high conductance, while maintaining sufficient structural rigidity to move without collapse. Thicker sections on the perimeter of the outer plate running parallel to the direction of movement of the valve may be used to improve structural rigidity while maintaining high conductance. Likewise for the inner plate, where thicker sections may be on the inner diameter.

Other shaped plates may also be used, and may generally conform to the shape of the fuel container and fuel cell. The valve plates may alternatively form a low friction contact fit in one embodiment as illustrated in FIGS. 1 and 2 to enable relative movement or sliding. A lubricant 170 may be used to reduce stiction between the plates. As illustrated, the lubricant is at least on the outside of the fixed plate 145 and the inside of the slideable plate 150 where the plates contact each other. The outer dimensions, such as diameter of the fixed plate 145 is very close to the dimensions of the inner dimensions of the slideable plate 150 to form the friction fit.

Material combinations should have low coefficient of friction facilitate easy sliding. The materials for both the inner and outer plates can be made of the same material, for example stainless steel or brass. Alternatively they can be of different materials, for example stainless steel or brass for the outer valve, and Teflon filled acetal for the inner valve. The inner diameter of the outer plate could be slightly smaller than the outer diameter of the inner plate, creating a sealing force as the outer plate expands to accommodate the inner plate.

In another embodiment, the outer plate could have a cut in the side, with an inside diameter slightly smaller than the outer diameter of the inner plate, such that the outer plate is expanded slightly when placed over the inner plate, and maintains a sealing force against the inner plate.

The lubricant may also operate as a sealant. In one embodiment, the lubricant may be graphite or silicone or other lubricant compatible with materials used and the electrochemical reactions occurring. Oil or other hydrocarbon lubricants may also be used.

Figure 3:
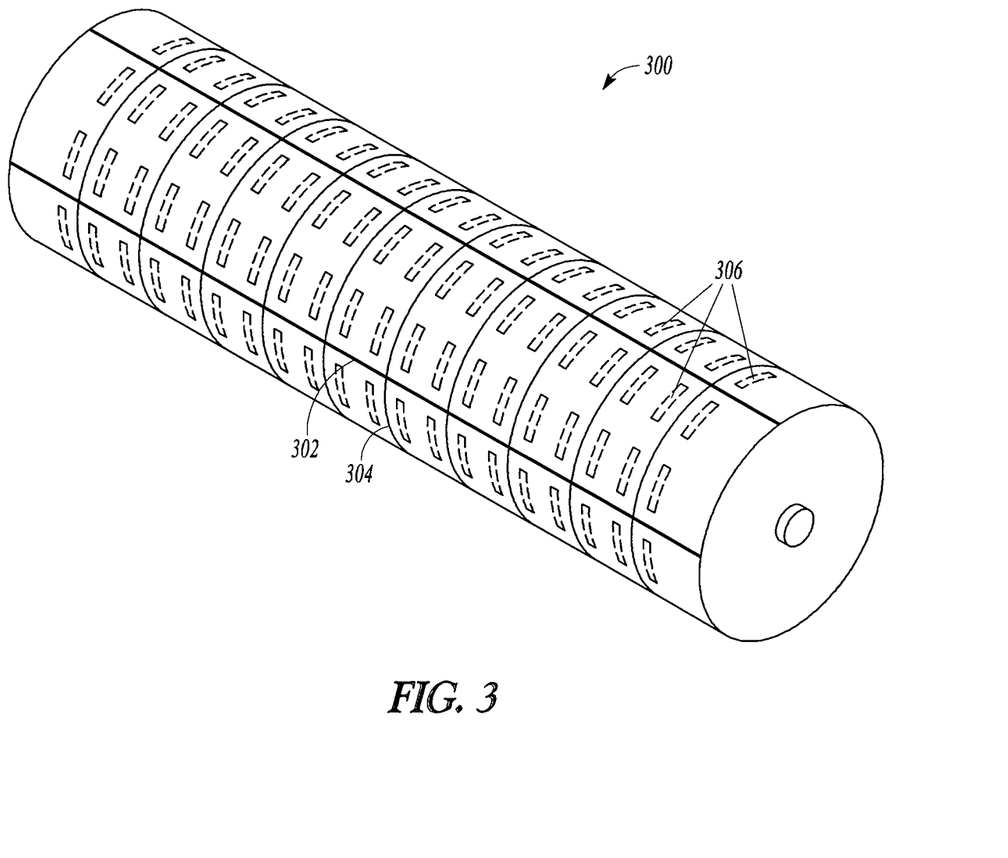
FIG. 3 illustrates a perspective view 300 of a slideable cylindrical valve, according to some embodiments.

FIG. 3 illustrates a perspective view 300 of a slideable cylindrical valve, according to some embodiments. The slideable cylindrical valve may include two concentric annular components. The central or inner component may be a fixed valve and include perforations in a regular or irregular pattern. The outer annular slideable component may be a movable or rideable valve and may be positioned over the fixed valve. Both the fixed valve and slideable valve may include perforations 306 that line up. Grooves 304 may divide sections of the slits 302 and perforations 306. The surface of the fixed member of valve 300 may be highly polished and may be covered in lubricant which reduces friction between the fixed valve and slideable valve and provides a gas seal between the fixed and slideable valves. When substantially sealed, the transmission of hydrogen through the valve is approximately 1% or less than the fully open transmittance.

Figure 4:
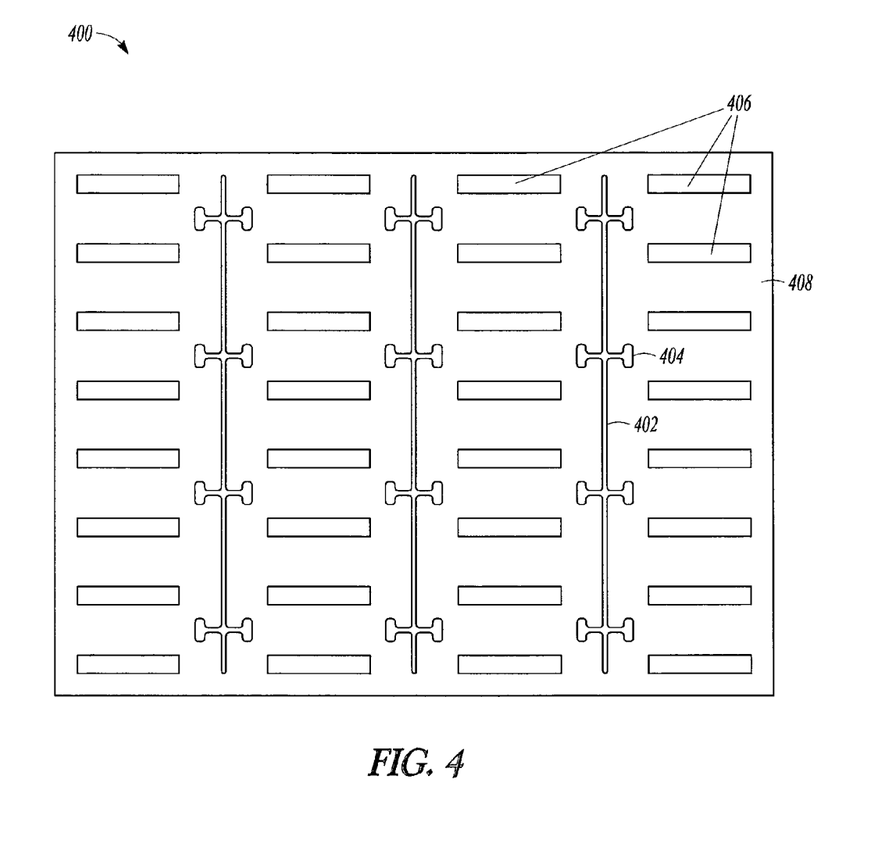
FIG. 4 illustrates a schematic view 400 of a perforation pattern for the slideable component 400 of the cylindrical valve, according to some embodiments.

FIG. 4 illustrates a schematic view 400 of a perforation pattern for the slideable component 408 of the cylindrical valve, according to some embodiments. The schematic view is shown as planar for convenience; in reality the slideable component is cylindrical. The fixed component of the cylindrical valve may be manufactured primarily of metal, such as stainless steel or brass. The slideable component 408 may also be manufactured primarily of metal such as stainless steel or brass and includes a perforation pattern 406 that substantially mimics that of the fixed component of the valve. Along the longitudinal axis of the slideable component and between the perforations may be slits 402 that separate the slideable component of the valve into flexible sections or "fingers". The term "longitudinal axis" refers to the height of the cylindrical valve as opposed to the circumference of the cylindrical valve. Displacement of the valve takes place along the longitudinal axis. These sections may be supported at the top and bottom, for example. In one embodiment, the slits are filled with a flexible material (e.g., silicone rubber), which is substantially co-planar with the slideable valve and allow the individual sections to flex and conform to the surface of the fixed valve. The slits may have retaining features 404 that serve as hinges or sutures between the sections, keeping the silicone rubber or other flexible material in place, and keeping the sections in alignment. This provides a substantially sealed closed valve position. When substantially sealed, the transmission of hydrogen and water vapor through the valve is approximately 1% or less than the fully open transmittance.

Figure 5:
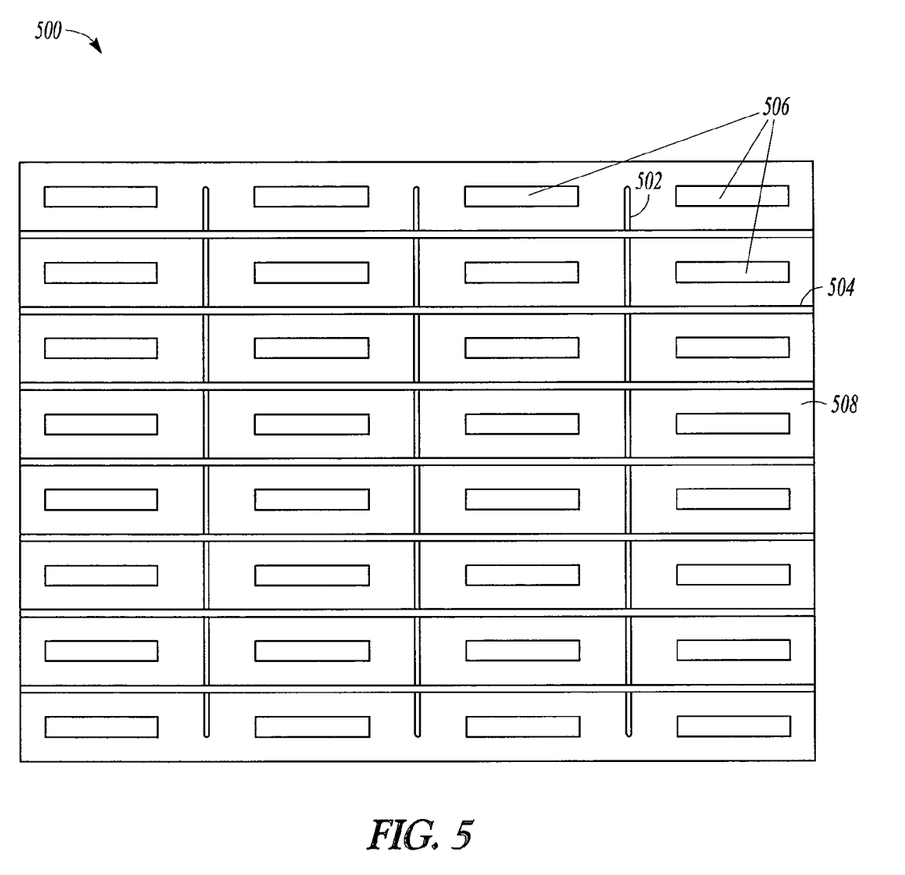
FIG. 5 illustrates a schematic view 500 of a perforation pattern for the slideable component 500 of the cylindrical valve, according to some embodiments.

FIG. 5 illustrates a schematic view 500 of a perforation pattern for the slideable component 508 of the cylindrical valve, according to some embodiments. The schematic view is shown as planar for convenience; in reality the slideable component is cylindrical. The fixed component of the cylindrical valve may be manufactured of a metal, such as stainless steel or brass. The slideable component 508 may also be manufactured primarily of metal such as stainless steel or brass and includes a perforation pattern 506 that substantially mimics that of the fixed component of the valve. Along the longitudinal axis of the slideable component and between the perforations may be slits 502 that separate the slideable component of the valve into flexible sections or "fingers". These sections may be supported at the top and bottom, for example.

Grooves 504 are provided that may contain a flexible material (e.g., a rubber band) wrapped around the circumference of the slideable valve that provide compressive force which holds the moveable valve against the fixed valve, providing a gas seal. When substantially sealed, the transmission of hydrogen through the valve is approximately 1% or less than the fully open transmittance.

The features shown in FIG. 4 and FIG. 5 may be used alone or in combination.

In operation, slideable plate 150 may be moved by a diaphragm 155 which is pressure sensitive. If the pressure of matter in the portion of the cell assembly in the volume proximate to slideable plate 150 increases, then diaphragm 155 may bulge out from the chamber volume proximate to slideable plate 150. Attached at about the center of diaphragm 155 may be a linkage 152 that is attached to slideable plate 150. When diaphragm 155 bulges out at the center (upward in the FIG. 1.) because of pressure, then the linkage 152 may likewise pull slideable plate 150 upward closing the valve and reducing the flow of matter such as water vapor and/or hydrogen gas through the plates in response to the increased pressure. If the pressure increases even more, then diaphragm 155 may expand further outward thereby causing slideable plate 150 to have its non-perforated areas overlap the perforations in fixed plate 145 and effectively stop the flow of matter (e.g., water vapor or hydrogen gas) through plates 145 and 150. As the pressure decreases in the chamber proximate to slideable plate 150, then diaphragm 155 may begin returning to a less bulged state and via the linkage push slideable plate 150 so that a part of the openings in both plates 145 and 150 are uncovered or unclosed. Further reduction of the pressure in chamber may result in diaphragm 155 returning to its initial open position thereby moving slideable plate 150 so that the openings 141 and 142 of plates 145 and 150 are aligned such that none of openings 141 and 142 in the plates are effectively obscured by either plate. Again, as the chamber pressure increases, valve 143 begins to close, and as the chamber pressure decreases, the valve 143 begins to open. Thus, the amount of flow through the valve 143 may be determined by the chamber pressure. This approach may provide a regulation of the flow or volume of the gas (e.g., hydrogen) or water vapor from fuel chamber 120 through the valve or of water vapor from the anode side of the fuel cell through the valve and into the fuel chamber. The slideable valve plate 150 may move about one millimeter from fully open to fully closed. Accordingly, hydrogen gas may automatically be produced at a rate at which it is consumed.

The valve mechanism described in FIGS. 1-5 may be designed into a cylindrical fuel cell device as shown in FIG. 3. The mechanism may also be designed into a fuel cell generator assembly having some other shape.

The power generator is self regulating based on the pressure and electrical demand. As electrical demand increases, hydrogen is consumed to produce the electricity needed by an electrical load. As the hydrogen is consumed, the pressure in the chamber adjacent to the fuel cells drops, valve 143 opens, and the pressure within the fuel chamber 120 also drops, resulting in the release of more hydrogen. As the electrical demand of the load decreases, less hydrogen is consumed, resulting in an increase in pressure, and preventing the further release of hydrogen from fuel 120. The hydrogen release rate can be very fast, limited only by the rate at which heat can be transferred to the fuel. In this manner, the power generator may provide bursts of power, without great deviation in pressure. The operating temperature may affect the equilibrium pressure within the cell, as the pressure varies with temperature.

The power generator 100 may be maintained at an operating temperature of from about −40° C. to about 85° C., from about −20° C. to about 50° C., from about 0° C. to about 50° C. and from about 20° C. to about 50° C. while in use, for example.

Fuel chamber 120 may contain a chemical hydride, a metal hydride or a mixture thereof.

The chemical hydride is any water-reactive hydrogen-producing material that reacts with water vapor to produce hydrogen. Exemplary chemical hydrides comprise $LiAlH_4$, $NaAlH_4$, $KAlH_4$, $MgAlH_4$, $CaH_2$, $LiBH_4$, $NaBH_4$, LiH, and $MgH_2$, alkali metals, alkaline earth metals, and alkali metal salicides. Specific chemical hydrides comprise $LiAlH_4$, $NaAlH_4$, $NaBH_4$, $LiBH_4$, LiH, or any combination thereof. In one embodiment, the chemical hydride is in the form of pellets.

The chemical hydride pellets may be manufactured with a controlled porosity. The size of the chemical hydride particles that comprise the chemical hydride pellets should be in a range from 1-10 μm diameter to minimize resistance to the flow of water vapor through the chemical hydride, and thus adversely affect the rate of hydrogen generation. The distribution of the chemical hydride particle size can be chosen to optimize for rate of reaction or for hydrogen generation capacity. For example a monodisperse distribution of small chemical hydride particles would allow slow flow of water vapor through the chemical hydride, have a high hydrogen generation capacity but a low rate of hydrogen generation. A monodisperse large particle size distribution would allow faster flow of water vapor through the chemical hydride, have a high rate of hydrogen generation, but have a low hydrogen generation capacity. A bimodal distribution in which smaller particles of chemical hydride fit within the interstices of the larger chemical hydride particles could provide a balance between the rate of hydrogen generation and hydrogen generation capacity. Other particle size distributions are also possible.

Additionally, by varying which chemical hydride is used, the rate of reaction with water vapor can be adjusted, and therefore the rate of hydrogen generation. This can also be accomplished by using mixtures of two or more chemical hydrides. By varying which chemical hydride is used, and at the same time using a mixture of chemical hydrides, and particle size distribution, the rate of reaction of the chemical hydride with water vapor can further be controlled.

The chemical hydride is described herein as a pellet. As used herein this term is used in a broad sense to describe any shape or configuration of the chemical hydride particles that occupy in the space allotted to the chemical hydride in the fuel source. Thus, the shape of the chemical hydride pellet is not critical. It may be a, layer, disk, tablet, sphere, or have no specific shape. The shape of the chemical hydride particles may be determined by the shape of the fuel source and the need to make the most efficient use of the space allotted to the chemical hydride. If appropriate, differently shaped chemical hydride pellets can be used within one fuel source.

The chemical hydride pellet stack may be a part of a removable and disposable or recyclable cartridge for an electrochemical cell such as a fuel cell. In such a cartridge, the metal hydride fuel would be retained in the electrochemical cell, while the stack of chemical hydride pellets and spacers would be removable. Alternatively, the chemical hydride pellets and a portion of the enclosure may be removable from the remainder of the enclosure containing the porous metal hydride. Thus, a fresh chemical hydride pellet stack could replace an exhausted chemical hydride pellet stack allowing the portion of the electrochemical cell containing the porous metal hydride to be reused. For example, the chemical hydride pellet stack can be of a size to fit into an electrical power generator the size of a standard "AA", "AAA", "C", or "D" cell (or any other battery size) that can be removed and replaced. The exhausted chemical hydride pellet stack could also be recycled by addition of new chemical hydride pellets.

Two or more compressed porous chemical hydride pellets may be contacted with, or at least partially surrounded or wrapped, or coated with a flexible, porous water-vapor permeable layer (such as TEFLON, GORE TEX, or NAFION) that prevents fuel particles from expanding into gas diffusion channels adjacent the pellets or other fuel source pellets. The gas diffusion channels may be constructed of porous metal hydride pellets for example. Air gaps may be located between individual chemical hydride pellets, and between the chemical hydride pellets and slide valve 143. A liquid water impermeable, hydrogen and water-vapor permeable membrane or a particulate membrane (such as TEFLON, GORE TEX, or NAFION) may also be positioned between chemical hydride pellets and slide valve 143.

When a chemical hydride is used as fuel, the water formed as a byproduct of an oxygen-hydrogen reaction at the fuel cell 125 may passively diffuse back through the slide valve into the fuel chamber 120. On the anode side 135 of the fuel cell 125, a relatively low humidity region may exist due to a moisture absorbing nature of the fuel substance in fuel chamber 120. Thus, the water retention at the cathode 140 may generate a moisture concentration gradient and a gas pressure differential which causes water molecules to diffuse back through the fuel cell 125 through the slide valve and into fuel chamber 120 in the form of water vapor. This water vapor may react with the chemical hydride fuel in fuel chamber 120 and generate hydrogen gas. The generated hydrogen gas may then pass back through the slide valve and to the fuel cell anode 135 where it can react with oxygen to once again generate electricity and water molecules. This cycle may continue until all of the fuel in chamber 120 is consumed.

In another embodiment, a metal hydride may be chosen as a fuel substance for the fuel storage substance. Metal hydrides function as a sort of hydrogen sponge that can quickly adsorb or desorb hydrogen at an almost constant pressure. Potential metal hydrides include ab5, ab2, ab, complex alloys, intermetallic compounds or solid solution alloys. Specific materials include but are not limited to $LaNi_5$, $LaNi_{4.6}Mn_{0.4}$, $MnNi_{3.5}Cu_{0.7}Al_{0.8}$, $MnNi_{4.2}Cu_{0.2}Mn_{0.3}Al_{0.3}$, $TiFe_{0.8}Ni_{0.2}$, $CaNi_5$, $(V_{0.9}Ti_{0.1})\ 0.95Fe_{0.05}$, $(V_{0.9}Ti_{0.1})\ 0.95Fe_{0.05}$, and $LaNi_{4.7}Al_{0.3}$ or any combination thereof.

In one embodiment, an AB5 type materials such as $LaNi_5$, or alloys containing other metals such as aluminum may be used as the reversible metal hydride. The other alloys such as aluminum may be used to tailor the pressure-temperature characteristics of the fuel so that the equilibrium hydrogen pressure at room temperature, approximately 20° C. is in the range of 0.1 PSI up to about 100 PSI or higher. In one embodiment, the pressure ranges up to about 10 PSI to avoid high rates of hydrogen leakage to ambient. Some applications may use even higher pressure with stronger containers. A higher fraction of aluminum results in a lower pressure equilibrium. In one embodiment the metal hydride is such that its equilibrium pressure is in the range of approximately 0.01 to 10 atmospheres over an approximately −20 to 60° C. temperature range.

In one embodiment, the metal hydride fuel storage material is in the form of solid pellets and is approximately 20% porous. The porosity may be varied to control volume expansion and hydrogen generation rate. Multiple pellet segments may be stacked vertically to provide a cylindrical pellet with larger height. The height of the individual segments may also be varied to increase the pellet surface area, which may also increase the hydrogen generation rate.

In one embodiment, fuel chamber 120 includes multiple metal hydride fuel pellets stacked in a vertical relationship. A hydrogen permeable membrane may optionally be disposed about the fuel pellet segments, which may be cylindrical in shape. The membrane may extend over the ends of the stack of fuel pellets in some embodiments. An air gap may be provided between the membrane and fuel pellet if desired.

The metal hydride is described herein as a pellet. As noted above, the term metal hydride pellet used herein this term is used in a broad sense to describe any shape or configuration of the metal hydride that occupies the space allotted to the metal hydride in the fuel source. Thus, the shape in which the porous metal hydride exists is not critical. It may be present as a porous film, web, layer, disk, tablet, sphere, or have no specific shape. The shape of the porous metal hydride pellet may be determined by the shape of the fuel source and the need to make the most efficient use of the space allotted to the metal hydride. If appropriate, differently shaped metal hydride pellets can be used within one fuel source.

In some embodiments, the fuel source comprises a combination of a chemical hydride and a metal hydride. A power generator with a fuel consisting of chemical hydride and metal hydride can accommodate pulses of power by using some of the hydrogen stored in the metal hydride, and can thus be designed for the average power of the range, resulting in lower cost, and reduced self-discharge. Additionally, sensitivity to ambient temperature and humidity may be reduced, because the power generator can draw on the hydrogen stored in the metal hydride.

In one embodiment, two or more chemical hydride pellets may be separated by a metal hydride pellet. The metal hydride may act as both a gas diffusion channel, and as a reversible hydrogen storage element for rapid delivery of hydrogen. The metal hydride may be positioned such that two stacks of chemical hydride pellets are formed. The two or more chemical hydride pellets may be contacted with, or at least partially surrounded or wrapped with a flexible, porous water-vapor permeable layer (such as TEFLON, GORE TEX, or NAFION). Each chemical hydride pellet may be separated by a spacer. Air gaps are between individual chemical hydride pellets, and between the chemical hydride pellets and perforated enclosure. A liquid water impermeable, hydrogen and water-vapor permeable membrane or a particulate membrane (such as TEFLON, GORE TEX, or NAFION) may also be positioned between the pellets and enclosure. A particulate filter may be positioned between the stacks of chemical hydride pellets and slide valve 143.

The walls of fuel chamber 120 may be the same as those of the inner valve or may be a separate structure that is located inside the valve. The enclosure may contain perforations to permit water ingress through the enclosure walls into the outer surface of the pellet, from where water can then diffuse inward. The enclosure may be shaped as a cylinder.

The fuel chamber 120 of the power generator may be sealed and fuel may added through an opening having a removable cover adjacent to or part of the fuel chamber 120 which seals fuel chamber 120 when the cover is in place.

While the present invention has been particularly shown and described with reference to many embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. An electrical power generator, comprising:
one or more fuel cells;
a fuel chamber, enclosing a hydrogen generating fuel; and
one or more valves, at least partially surrounding the fuel chamber; wherein the one or more valves includes concentric inner and outer components:
a fixed component with first perforations; and
a slideable component with second perforations, having a plurality of separated flexible sections; wherein the flexible sections are supported at the top and bottom, wherein the separation of the flexible sections is formed by slits that are in a longitudinal direction, and wherein the flexible sections are thicker on the sides adjacent to the slits to improve structural rigidity.

2. The electrical power generator of claim 1 wherein, the concentric components are cylindrical and the inner cylindrical component is fixed and the outer cylindrical component is slideable.

3. The electrical power generator of claim 2 wherein the inner cylindrical component and the outer slideable component comprise a metal.

4. The electrical power generator of claim 3 wherein the both the inner fixed cylindrical component and the outer cylindrical slideable component comprise brass or stainless steel.

5. The electrical power generator of claim 1 wherein the hydrogen generating fuel comprises a chemical hydride, a metal hydride, or both a chemical hydride and a metal hydride.

6. The electrical power generator of claim 1, wherein the flexible sections are separated by a flexible component.

7. The electrical power generator of claim 6, wherein the slits are substantially filled with a flexible material.

8. The electrical power generator of claim 7, wherein the flexible material is silicone rubber.

9. The electrical power generator of claim 1, further comprising a flexible material wrapped around the circumference of the slideable valve.

10. The electrical power generator of claim 9, wherein the flexible material is a silicone rubber.

11. A fuel cell system valve comprising concentric inner and outer components;
a fixed component with first perforations; and
a slideable component with second perforations and having a plurality of separated flexible sections, positioned thereon; and
wherein the flexible sections are supported at the top and bottom;
wherein the separation of the flexible sections is formed by slits that are in a longitudinal direction; and
wherein the flexible sections are thicker on the sides adjacent to the slits to improve structural rigidity.

12. The fuel cell system valve of claim 11 wherein, the concentric components are cylindrical and the inner cylindrical component is fixed and the outer cylindrical component is slideable.

13. The fuel cell system valve of claim 11, wherein the inner cylindrical component and the outer slideable component comprise a metal.

14. The fuel cell system valve of claim 13 wherein the both the inner cylindrical component and the outer slideable component comprise brass or stainless steel.

15. The fuel cell system valve of claim 11, wherein the flexible sections are separated by a flexible component.

16. The fuel cell system valve of claim 15, wherein the slits are substantially filled with a flexible material.

17. The fuel cell system valve of claim 16, wherein the flexible component comprises a silicone rubber.

18. The fuel cell system valve of claim 11, further comprising a flexible material wrapped around the circumference of the slideable valve.

19. The fuel cell system valve of claim 18, wherein the flexible material is a rubber band.

20. The fuel cell system valve of claim 11, wherein the valve at least partially surrounds a hydrogen generating fuel.

* * * * *